Oct. 4, 1932.   L. W. YOUNG   1,880,649
SOLDERING IRON
Filed July 7, 1930
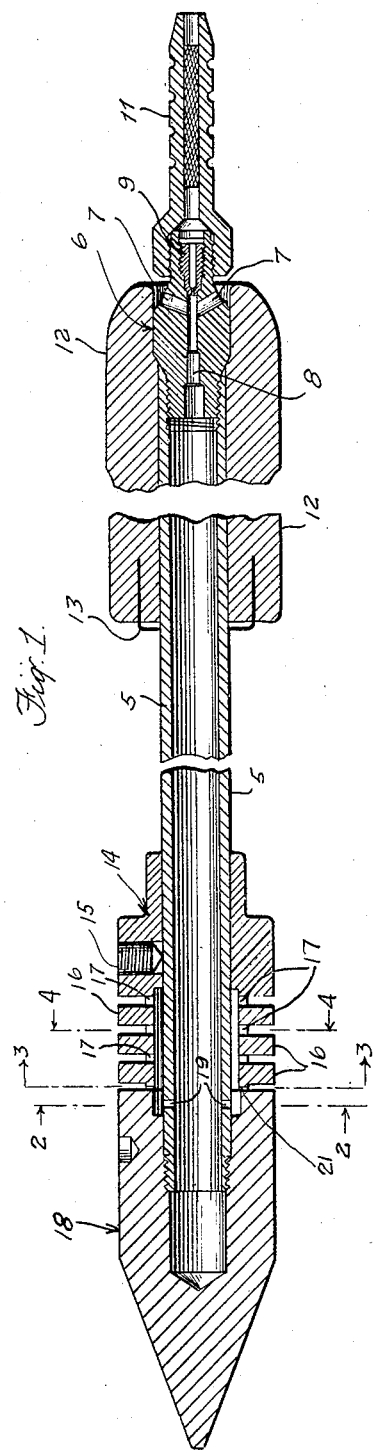
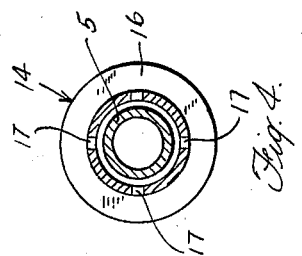
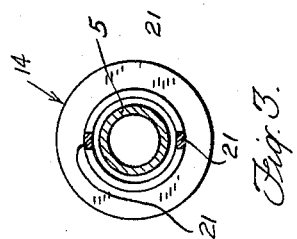
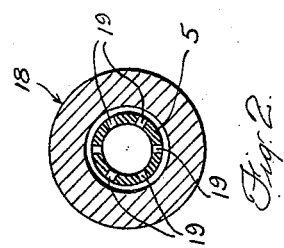
Lloyd W. Young,
INVENTOR,
BY
ATTORNEYS.

Patented Oct. 4, 1932

1,880,649

UNITED STATES PATENT OFFICE

LLOYD W. YOUNG, OF BUFFALO, NEW YORK, ASSIGNOR TO THE PREST-O-LITE COMPANY, INC., A CORPORATION OF NEW YORK

SOLDERING IRON

Application filed July 7, 1930. Serial No. 466,219.

This invention relates to soldering irons, more particularly to self-heating soldering irons in which a gaseous fuel is used as the heating medium.

An object of my invention is to provide an improved soldering iron having means for more thoroughly and completely mixing air with a fuel gas to produce a non-exposed heating flame.

Another object is to provide a soldering iron having more efficient means for heating the soldering tip to a higher temperature with a reduction in consumption of fuel gas.

A further object is to provide an easily assembled soldering iron of simple and durable construction having incorporated therein means for cooling the exhaust gases to eliminate secondary or external flames.

The advantages and novel features of my invention will be evident from a description of the accompanying drawing forming a part of this specification, and in which:

Fig. 1 is a central longitudinal section of a soldering iron embodying this invention;

Fig. 2 is a sectional view on the line 2—2 of Fig. 1;

Fig. 3 is a sectional view on the line 3—3 of Fig. 1; and

Fig. 4 is a sectional view on the line 4—4 of Fig. 1.

In the modification shown reference numeral 5 indicates a steel tube. Internal threads on one end of the tube 5 carry an injector body 6, which is hexagonal in cross section and is provided with inclined air ports 7 communicating with a central passage 8. An injector 9 is screwed into the end of the member 6 with its orifice just back of the air ports 7. The nipple 11 serves as a hose connection to the fuel gas supply. A handle 12 of wood or other heat insulating material carrying the washer 13 is pressed over the tube 5 with its rear portion partly covering the injector body 6, the six sides of which aid in preventing the handle from turning or loosening. The rear end of the handle serves as a guard for the air ports 7 and prevents them from being readily covered by the hand of the operator.

The other end of the tube 5 is externally threaded to carry the copper soldering tip or bit 18. Slightly back of the threaded joint are six small holes 19 drilled around the circumference of the steel tube 5. These holes serve as burners for the combustion mixture. The inner rear wall of the bit 18 is spaced slightly from the tube 5 to form a combustion chamber around the burner holes 19 of sufficient diameter to permit the ends of the cones of flame issuing from the burners to contact directly with the wall of the soldering tip. A collar 14 is held in position on the tube adjacent to the bit 18 by a set screw 15. This collar is provided with fins 16, between which are located a plurality of exhaust ports 17 for the waste gases, the forward portion of the collar carrying the fins being spaced slightly from the tube 5 to form an annular chamber communicating with the combustion chamber.

To operate the iron, fuel gas is introduced into the iron through the hose nipple 11 at a pressure, if acetylene is used, of from two to twelve pounds. The gas, passing through the orifice of the injector 9 at high velocity draws in sufficient air through the ports 7 to form a combustible gas mixture. The acetylene and air mixture enters the tube 5 through the passage 8 of the member 6 where it is conducted directly to the combustion chamber of the soldering tip. Thus the tube 5 not only acts as a passage and mixing chamber for the gaseous mixture but also serves as a stem between the soldering tip 18 and the handle 12. As previously stated combustion takes place in the form of six small jets of flame radially disposed about the circumference of the tube 5, the ends of said jets contacting directly with a rear portion of the soldering tip. This produces the hottest type of flame and results in a very efficient and even distribution of the heat of combustion about the body of the tip.

It has been shown by experience that it is very difficult to obtain complete combustion in a confined chamber of the nature here shown. Consequently a certain amount of carbon monoxide is usually formed which, with the older types of soldering iron, would burn to dioxide through the vent ports when the iron became hot. With my invention the three sets of exhaust ports 17 are surrounded by the air cooled spaced fins 16 carried on the collar 14. As shown in Figure 3 only two very small portions 21 of the collar 14 contact directly with the soldering tip 18. Thus the fins 16 remain quite cool and serve to lower the temperature of the waste gases to a point below the kindling temperature of carbon monoxide, thereby eliminating any secondary or external flame. The collar 14 also aids in dissipating considerable heat which ordinarily is conducted back to the handle portion of the iron thus producing a lower than usual handle temperature.

The simplicity of the soldering iron of my invention permits its use over a wide operating range. While I have described the operation of the iron with the use of acetylene as a fuel, various other compressed fuel gases, such as compressed paraffine hydrocarbons or mixtures thereof, may also be used with corresponding advantages. Slight changes in the size of the air intake ports may easily be made to accommodate the particular fuel gas and pressure employed. Various other modifications in the preferred form as illustrated and described may also be made without departing from the spirit of my invention as defined in the appended claims.

I claim:

1. A soldering iron comprising a metal tube serving as a gas passage, means in one end of said tube for introducing therein a combustible gas mixture, a soldering bit on the other end of said tube having a combustion chamber therein spaced about the tube, and a plurality of burner orifices spaced radially in the wall of said tube within the combustion chamber.

2. A soldering iron comprising a metal tube serving as a gas passage, means in one end of said tube for injecting thereinto a combustible gas mixture, a soldering bit on the other end of said tube having a combustion chamber therein, a plurality of burners in said tube within the combustion chamber, exhaust ports adjacent the combustion chamber, and means associated with the exhaust ports for cooling the waste gases.

3. A soldering iron comprising a metal tube, an injection body on one end of said tube for supplying a combustible gas mixture into the tube, a soldering bit on the other end of said tube having a combustion chamber therein, a plurality of burners on said tube within the combustion chamber, a collar adjacent said soldering bit having a plurality of exhaust ports, and fins on said collar for cooling the waste gases.

4. A soldering iron comprising a metal tube, an injector body connected with one end of said tube having air intake ports therein and an injector for fuel gas, a soldering bit connected over the other end of said tube having a portion thereof spaced from the tube to form a combustion chamber, a plurality of burners radially disposed about the tube within the combustion chamber, a collar adjacent said soldering bit having a plurality of exhaust ports therein, and annular fins on said collar for cooling the waste gases.

5. A soldering iron comprising a metal tube, an injector body connected with one end of said tube having air intake ports therein and an injector for fuel gas, a handle surrounding the junction of said body and tube, a soldering bit fitting over the other end of said tube having a rearwardly extending portion spaced slightly from the tube to form a combustion chamber, a plurality of burners about the circumference of said tube within the combustion chamber, a collar on said tube adjacent said bit having a plurality of exhaust ports communicating with the combustion chamber, and annular fins on said collar adjacent the exhaust ports for cooling the waste gases.

6. A soldering iron comprising a soldering bit having a combustion chamber therein, means for heating said bit, an injector body, a tube extending from said injector body to said bit and carrying said heating means, and a collar on said tube adjacent said bit having exhaust ports communicating with the combustion chamber and fins adjacent said exhaust ports adapted to cool the waste gases.

In testimony whereof, I affix my signature.

LLOYD W. YOUNG.